United States Patent [19]

Kakimoto et al.

[11] Patent Number: 5,062,654
[45] Date of Patent: Nov. 5, 1991

[54] BUSH ASSEMBLY

[75] Inventors: Toshihiko Kakimoto; Takuya Murakami, both of Kanagawa, Japan

[73] Assignee: Nissan Motor Company, Limited, Yokohama, Japan

[21] Appl. No.: 666,480

[22] Filed: Mar. 5, 1991

Related U.S. Application Data

[63] Continuation of Ser. No. 259,819, Oct. 19, 1988, abandoned.

[30] Foreign Application Priority Data

Oct. 19, 1987 [JP] Japan ................................ 62-261773

[51] Int. Cl.⁵ .............................................. F16F 1/38
[52] U.S. Cl. .................................... 280/673; 267/279; 267/141; 267/293; 403/228; 384/147; 384/153
[58] Field of Search ............... 280/673; 384/138, 139, 384/140, 141, 147, 151, 153, 215, 484–486, 222; 267/292, 293, 270, 269, 279, 280, 152, 140.1; 403/225, 228, 221; 277/207 R, 208, 102, 152

[56] References Cited

U.S. PATENT DOCUMENTS

| | | | |
|---|---|---|---|
| 3,230,000 | 1/1966 | Simpson | 403/228 |
| 4,667,943 | 5/1987 | Izumi et al. | 403/228 |
| 4,744,677 | 5/1988 | Tanaka et al. | 403/225 |
| 4,767,108 | 8/1988 | Tanaka et al. | 384/147 |
| 4,809,960 | 3/1989 | Kakimoto | 384/153 |

Primary Examiner—Kenneth R. Rice
Assistant Examiner—Karin Tyson
Attorney, Agent, or Firm—Foley & Lardner

[57] ABSTRACT

A bush assembly includes an inner cylindrical member for supporting an elongated member, a rigid sleeve slidably fixed to the outer surface of the inner cylindrical memer via a slipping member, and an outer cylindrical member fixed to the outer surface of the rigid sleeve via an elastic member. The rigid sleeve has a greater diameter portion at one end thereof so that an annular space is formed between the greater diameter portion and one end of the inner cylindrical member. The bush assembly further includes a sealing member which is disposed in the annular space for preventing muddy water or the like from getting into the interfaces between the slipping member and the inner cylindrical member and between the slipping member and the rigid sleeve. The elastic member has a radially extending projection for interrupting muddy water or the like getting into the interface between the outer cylindrical member and a member which is to be connected another member via the bush assembly.

4 Claims, 3 Drawing Sheets

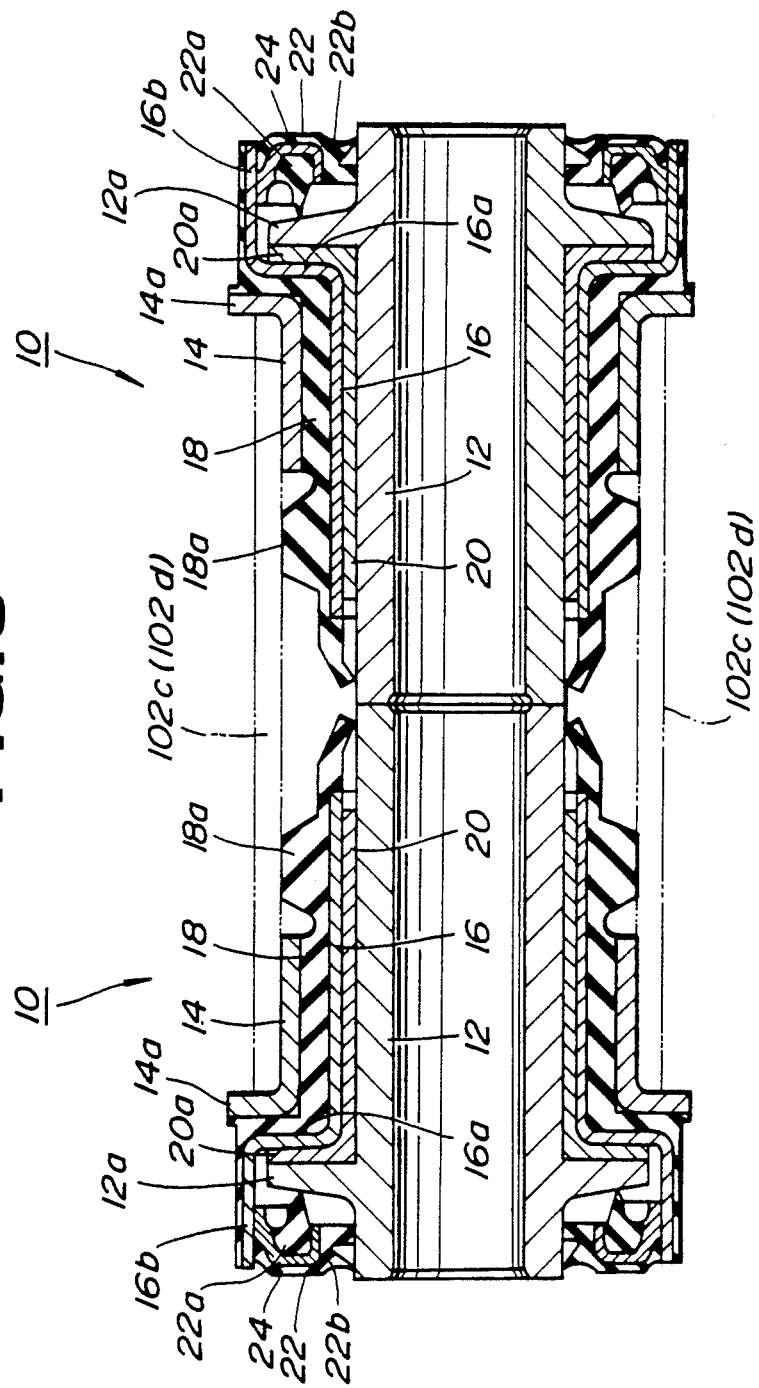

BUSH ASSEMBLY

This application is a continuation of application Ser. No. 07/259,819 filed Oct. 19, 1988, now abandoned.

BACKGROUND OF THE INVENTION

1. Field of the Invention

The present invention relates generally to a bush assembly used for fixing an elongated member to a stationary base. More specifically, the invention relates to a bush assembly or a slipping bush which can be used for fixing the upper arm of a double wishbone type suspension to a vehicular body.

2. Description of the Prior Art

As is well known, the upper arm of a double wishbone type suspension is oscillatably fixed to a vehicle body by means of a bush assembly. Such a bush assembly generally comprises an inner cylindrical member, an outer cylindrical member arranged so that the axis thereof coincides with that of the inner cylindrical member, and a rigid sleeve arranged therebetween. The rigid sleeve is fixed to the inner surface of the outer cylindrical member by means of an elastic member, and slidably engages the outer surface of the inner cylindrical member via a slipping member.

The upper arm is provided with a holding portion which has an essentially cylindrical through opening in which the outer cylindrical member is fixed. A supporting pin is inserted into the inner cylindrical member and is connected to the vehicle body, so that the wheel can be connected to the vehicle body.

In such a bush assembly, since the outer cylindrical member and the holding portion are made of a metal, if muddy water or the like gets into the interface between the outer metallic member 14 and the through opening of the holding portion from the outside, the bush assembly tends to corrode, so that durability of the bush assembly is decreased.

In order to eliminate the aforementioned disadvantages, i.e. to prevent muddy water or the like from getting the interface, the U.S. Pat. No. 3,526,413 to Alf John Muller et al, filed on Feb. 14, 1968, discloses a bush assembly which does not have any outer cylindrical metallic member, and in which the outer surface of the elastic member is directly fixed in the through opening of the holding portion.

However, it is difficult to insert this bush assembly into the through opening of the holding portion, since it does not have any outer cylindrical member, i.e. an elastic member is arranged on the outside.

SUMMARY OF THE INVENTION

It is therefore a principal object of the present invention to eliminate the aforementioned disadvantage and to provide a bush assembly which prevents water or the like from getting into the interior of the assembly, and which can be easily inserted into a through opening of a member which is to be connected to another member by means of the bush assembly.

In order to accomplish the aforementioned and other specific objects, a bush assembly, according to the present invention, includes an elastic member with a radially extending projection.

According to one aspect of the present invention, a bush assembly used for a first member having an essentially cylindrical opening to a second member, comprises:

an inner cylindrical member for supporting an elongated member which engages the second member;

an outer cylindrical member which engages the opening of the first member;

a rigid sleeve between the inner and outer cylindrical members, having a greater inner diameter portion at one end to form an annular space;

an elastic member fixed to the outer cylindrical member and to the rigid sleeve, the elastic member having a radially extending projection which engages the opening of the first member, the outer diameter of the radially extending projection being greater than that of the outer cylindrical member;

a slipping member between the rigid sleeve and the inner cylindrical member; and a sealing member in the annular space, a portion of which is fixed to the rigid sleeve, and another portion of which contacts the inner cylindrical member.

The bush assembly may further comprise a ring member which is embedded in the sealing member for reinforcement.

BRIEF DESCRIPTION OF THE DRAWINGS

FIG. 3 is a longitudinal sectional view of the preferred embodiment of a bush assembly according to the present invention, when the assembly is inserted into a through opening formed in the upper arm of the double wishbone type suspension of FIG. 2.

DESCRIPTION THE PREFERRED EMBODIMENT

Figure 1:
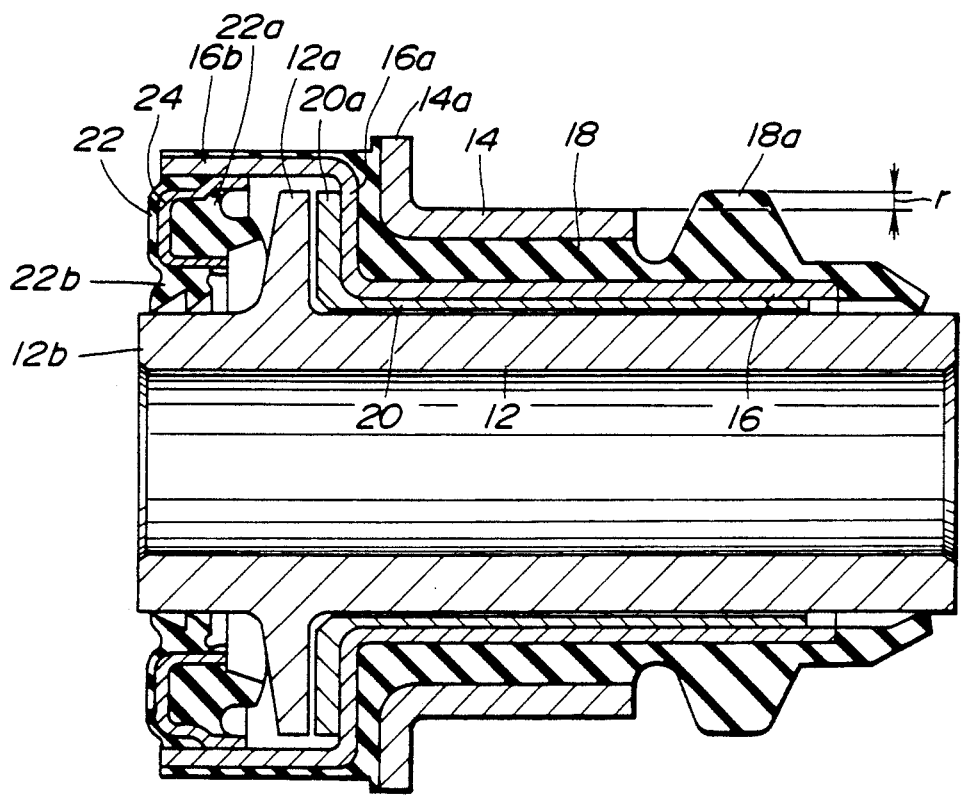
FIG. 1 is a longitudinal sectional view of the preferred embodiment of a bush assembly according to the present invention.

Referring now to the drawings, particularly to FIG. 1, a bush assembly 10 includes an essentially cylindrical inner metallic member 12 and an essentially cylindrical outer metallic member 14. The inner cylindrical member 12 has an essentially radially extending portion 12a which extends radially from a location neighboring an end portion 12b. The outer cylindrical member 14 also has an essentially radially extending portion 14a which extends radially from one end thereof. The outer cylindrical member 14 is arranged so that the central axis thereof coincides with that of the inner cylindrical member 12, and that the radially extending portion 14a is in parallel to the radially extending portion 12a. An essentially cylindrical rigid sleeve 16 is arranged between the inner and outer cylindrical members 12 and 14. The rigid sleeve 16 has an essentially radially extending portion 16a which extends radially from one end thereof, and a greater diameter portion 16b which extends from the free end of the radially extending portion 16a in parallel to the axis of the rigid sleeve 16. The outer surface of the rigid sleeve 16 is fixed to the inner surface of the outer cylindrical member 14 via an elastic member 18 by vulcanizing the elastic member 18. The radially extending portion 16a is also fixed to the radially extending portion 14a via the elastic member 18 in a similar manner. The inner surface of the rigid sleeve 16 slidably engages the outer surface of the inner cylindrical member 12 via a slipping member 20. The slipping member 20 has a radially extending portion 20a which extends essentially radially from one end thereof, so that the radially extending portion 20a is arranged between the radially extending portions 12a and 20a.

A sealing member 22 is inserted into an annular space which is formed between the greater diameter portion 16b of the rigid sleeve 16, and the radially extending portion 12a and the end portion 12b of the inner cylindrical member 12.

The outer portion 22a of the sealing member 22, in which a ring member 24 is embedded for reinforcement, is fixed to the greater diameter portion 16b of the rigid sleeve 16. On the other hand, the inner portion 22b of the sealing member 22 slidably contacts the end portion 12b of the inner cylindrical member 12.

According to the present invention, the elastic member 18 has a radially extending projection 18a which is arranged near the opposite end of the outer cylindrical member 14 from the radially extending portion 14a. The outer diameter of the radially extending projection 18a is greater than that of the outer cylindrical member 14 by 2r.

A process for manufacturing a bush assembly, according to the present invention, is described below.

First, the outer surface of the rigid sleeve 16 is fixed to the inner surface of the outer cylindrical member 14 via the elastic member 18 by vulcanizing the elastic member 18. Then, the slipping member 20 is inserted into the rigid sleeve 16, and the radially extending portion 20a of the slipping member 20 is brought into contact with the radially extending portion 16a of the rigid sleeve 16. Thereafter, the inner cylindrical member 12 is inserted into the slipping member 20, and the radially extending portion 12a of the inner cylindrical member 12 is brought into contact with the radially extending portion 20a of the slipping member 20. Finally, the sealing member 22 is inserted in the annular space between the greater diameter portion 16b of the rigid sleeve 16, and the radially extending portion 12a and the end portion 12b of the inner cylindrical member 12.

Figure 2:
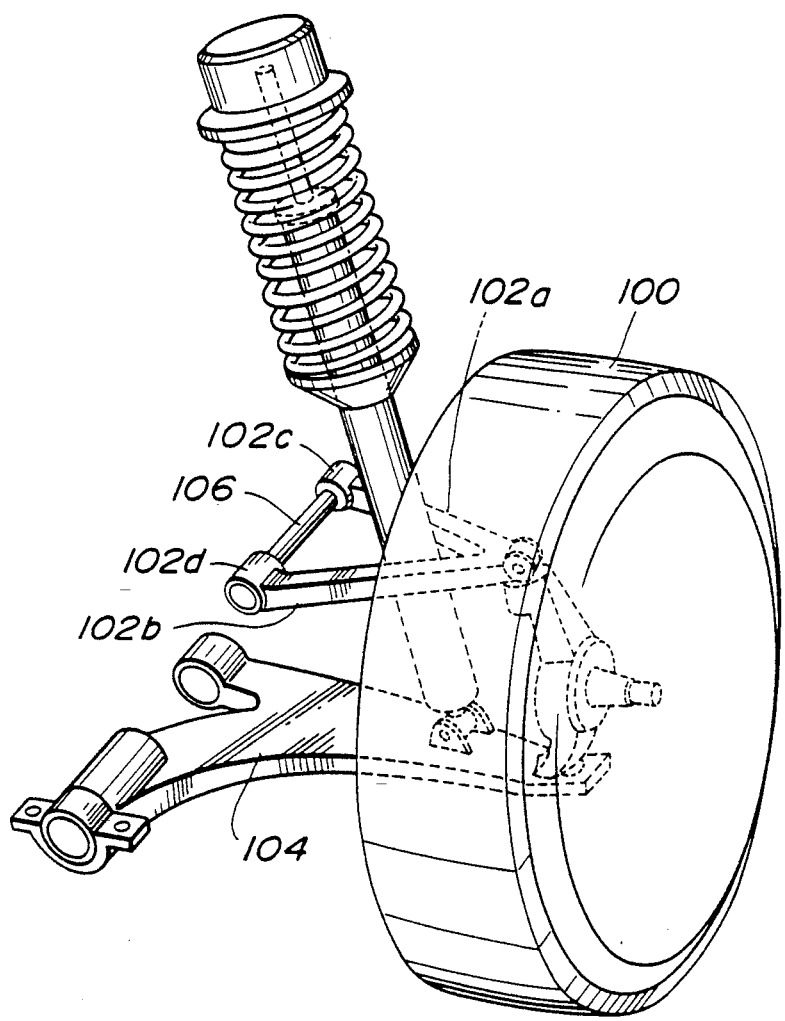
FIG. 2 is a perspective view of a double wishbone type suspension in which the bush assembly of FIG. 1 is used.

A bush assembly 10, according to the present invention, may be used for double wishbone type suspensions. As shown in FIG. 2, in double wishbone type suspensions, a wheel 100 is supported on the vehicular body not shown via upper and lower arms 102 and 104. The upper arm branches and has two fork arm portions 102a and 102b. The respective free ends of the fork arm portions 102a and 102b are provided with holding portions 102c and 102d which has essentially cylindrical through openings. A pair of bush assemblies are inserted into each of the through openings of the holding portions 102c and 102d. The bush assemblies are arranged as shown in FIG. 3. Since the outer diameter of the radially extending projection 18a of the elastic member 18 is greater than that of the outer cylindrical member 14, the radially extending projection 18a is compressed in the through opening of the holding portion 102c or 102d, so that the bush assemblies 10 are securely fixed therein. After inserting the two sets of bush assemblies into the through openings of the holding portions 102c and 102d, a supporting pin 106 is inserted into the inner cylindrical members 12. Thereafter, the supporting pin 106 is connected to the vehicle body.

With the aforementioned constructions, when an external force is applied to the inner or outer cylindrical member 12 or 14, the elastic member 18 provided between the outer cylindrical member 14 and the rigid sleeve 16 is elastically deformed. Therefore, for example, vibration and so forth applied to the outer cylindrical member via the wheel 100 and the upper arm 102 are absorbed in the elastic member 18, so that it is possible to prevent the latter from being transmitted to the inner cylindrical member 12, the supporting pin 106 and the vehicle body. In addition, since the slipping member 20 is provided between the rigid sleeve 16 and inner cylindrical member 12, the rigid sleeve can be rotated in relation to the inner cylindrical member 12, i.e. the outer cylindrical member 14 can be rotated in relation to the inner cylindrical member 12.

The sealing member 22 serves to prevent muddy water or the like from getting into the interfaces between the slipping member 20 and the inner cylindrical member 12, and between the slipping member 20a and the rigid sleeve 16, so that corrosion is avoided, thereby the duration of life of the bush assembly is increased.

In addition, even if muddy water or the like gets into the interface between the outer metallic member 14 and the through opening of the holding portion 102c or 102d, i.e. between metallic members, it is interrupted by means of the radially extending projection 18a which is tightly kept in contact with the through opening of the holding portion 102c or 102d, so that it can not reach the slipping member 20. That is, the radially extending projection also serves to prevent muddy water or the like from getting into the interfaces between the slipping member 20 and the inner cylindrical member 12, and between the slipping member 20a and the rigid sleeve 16.

Although a bush assembly of the invention is used for fixing the upper arm of a double wishbone type suspension, the bush assembly of the invention can be generally used for receiving an elongated member for connecting a first member, which engages the elongated member, to a second member which engages the outer cylindrical member of the bush assembly, according to the present invention.

What is claimed is:

1. A bush assembly used for fixing a first member having an essentially cylindrical opening to a second member, said bush assembly comprising:

an inner cylindrical member defining therein an essentially cylindrical space for supporting an elongated member which engages said second member;

an outer cylindrical member which engages said opening of the first member, the outer cylindrical member being arranged so that the axis thereof substantially coincides with that of said inner cylindrical member;

a rigid sleeve arranged between said inner and outer cylindrical members, said rigid sleeve having a greater inner diameter portion at one end thereof so as to form an annular space between the greater inner diameter portion and said inner cylindrical member;

an elastic member, one surface of which is fixed to said outer cylindrical member, and the other surface of which is fixed to said rigid sleeve, said elastic member having a radially extending projection which engages said opening of the first member, the outer diameter of said radially extending projection being greater than that of said outer cylindrical member;

a slipping member arranged between said rigid sleeve and said inner cylindrical member so that said rigid sleeve slidably engages said inner cylindrical member; and a sealing member disposed in said annular space, a portion of which is fixed to one of said rigid sleeve and said inner cylindrical member, and another portion of which contacts the other of said rigid sleeve and said inner cylindrical member.

2. A bush assembly as set forth in claim 1, which further comprises a ring member which is embedded in said sealing member for reinforcement.

3. A bush assembly used for fixing the upper arm of a double wishbone type suspension to the vehicle body, which comprises:

an inner cylindrical member defining therein an essentially cylindrical space for supporting an elongated member connected to the vehicle body;

an outer cylindrical member which engaging an through opening formed in said upper arm, said outer cylindrical member being arranged so that the axis thereof substantially coincides with that of said inner cylindrical member;

a rigid sleeve arranged between said inner and outer cylindrical members, said rigid sleeve having greater inner diameter portion at one end thereof so as to form an annular space between the greater diameter portion and said inner cylindrical member;

an elastic member, one surface of which is fixed to said outer cylindrical member, and the outer surface of which is fixed to said rigid sleeve, said elastic member having a radially extending projection for engaging said through opening of the upper arm, the outer diameter of said radially extending projection being greater than that of said outer cylindrical member;

a slipping member arranged between said rigid sleeve and said inner cylindrical member so that said rigid sleeve slidably engages said inner cylindrical member; and a sealing member disposed in said annular space, a portion of which is fixed to one of said rigid sleeve and said inner cylindrical member, and another portion of which contacts the other of said rigid sleeve and said inner cylindrical member.

4. A bush assembly as set forth in claim 3, which further comprises a ring member which is embedded in said outer portion of the sealing member for reinforcement.

* * * * *